United States Patent
Abe et al.

(10) Patent No.: US 11,956,574 B2
(45) Date of Patent: Apr. 9, 2024

(54) OPTICAL COMMUNICATION NETWORK SYSTEM, OPTICAL NETWORK UNIT, AND OPTICAL COMMUNICATION METHOD

(71) Applicant: NIPPON TELEGRAPH AND TELEPHONE CORPORATION, Tokyo (JP)

(72) Inventors: Takuya Abe, Musashino (JP); Satoshi Narikawa, Musashino (JP); Tomohiko Ikeda, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 27 days.

(21) Appl. No.: 17/915,708

(22) PCT Filed: Mar. 31, 2020

(86) PCT No.: PCT/JP2020/014758
§ 371 (c)(1),
(2) Date: Sep. 29, 2022

(87) PCT Pub. No.: WO2021/199249
PCT Pub. Date: Oct. 7, 2021

(65) Prior Publication Data
US 2023/0132674 A1 May 4, 2023

(51) Int. Cl.
*H04B 10/00* (2013.01)
*H04B 10/27* (2013.01)
(Continued)

(52) U.S. Cl.
CPC ......... *H04Q 11/0062* (2013.01); *H04B 10/27* (2013.01)

(58) Field of Classification Search
CPC ........ H04J 14/08; H04J 14/086; H04B 10/272
See application file for complete search history.

(56) References Cited

U.S. PATENT DOCUMENTS

| | | | | |
|---|---|---|---|---|
| 2009/0219900 A1* | 9/2009 | Kokkinen | ........... | B61L 15/0027 370/338 |
| 2010/0202467 A1* | 8/2010 | Otani | .................. | H04L 12/2834 370/401 |
| 2020/0322052 A1* | 10/2020 | Yigit | ..................... | H04B 10/27 |

FOREIGN PATENT DOCUMENTS

JP   200774256 A   3/2007

OTHER PUBLICATIONS

Basic Technology Course [GE-PON Technology] 4th GE-PON Systematization Function, NTT Technical Journal, vol. 17, No. 11, 2005, pp. 59-61.

(Continued)

*Primary Examiner* — Daniel G Dobson
(74) *Attorney, Agent, or Firm* — Harness, Dickey & Pierce, P.L.C.

(57) ABSTRACT

An object of the present disclosure is to enable an ONU to acquire ID information of terminal devices even when a network device is connected between the ONU and the terminal devices, and to thereby enable generation of a logical path between the ONU and the OLT. The present disclosure relates to an optical communication network system configured to connect terminal devices and a passive optical network (PON) system via a network device. The PON system includes an optical line terminal and an optical network unit connected using an optical transmission line. The optical network unit is configured to construct a tunnel to the network device, acquire ID information of the terminal devices connected to the network device from the terminal devices via the tunnel, and generates a logical path to the optical line terminal on the optical transmission line using the acquired ID information.

4 Claims, 9 Drawing Sheets

(51) Int. Cl.
*H04Q 11/00* (2006.01)
*H04J 14/00* (2006.01)

(56) References Cited

OTHER PUBLICATIONS

LAN/MAN Standards Committee of the IEEE Computer Society, IEEE Standard for Ethernet, IEEE802.3-2018 clause 64, Aug. 31, 2018.
IEEE Standard for Service Interoperability in Ethernet Passive Optical Networks (SIEPON), IEEE Std. 1904.1-2017, Jul. 24, 2017, pp. 306-310.

* cited by examiner

OPTICAL COMMUNICATION NETWORK SYSTEM, OPTICAL NETWORK UNIT, AND OPTICAL COMMUNICATION METHOD

CROSS-REFERENCE TO RELATED APPLICATIONS

This application is a 371 U.S. National Phase of International Application No. PCT/JP2020/014758, filed on Mar. 31, 2020. The entire disclosure of the above application is incorporated herein by reference.

TECHNICAL FIELD

The disclosure relates to an optical communication network system (passive optical network (PON) system) and an optical communication method.

BACKGROUND ART

For users using network services by connecting to a network through an optical transmission line, a technology to connect optical network units in customer premises to the network via an optical line terminal (OLT) has been proposed (see, for example, Non-Patent Literature 1).

In Non-Patent Literature 2, an OLT uses a logical link ID (LLID) to identify the logical path of each ONU. In Non-Patent Literature 3, each ONU has one media access control (MAC) address, and an OLT allocates one LLID to each ONU based on the MAC address possessed by each ONU. The ONU performs authentication based on the LLID and generates a logical path. In this connection, a technology has been proposed that allows a single ONU to construct a plurality of logical paths by allocating a plurality of LLIDs and MAC addresses to the single ONU (see, for example, Patent Literature 1).

However, to allocate LLIDs, the MAC addresses, corresponding to the number of logical paths to be generated for an ONU, need to be set in advance, which makes it difficult to increase the number of logical paths as desired. Specifically, in a conventional LLID distribution technology, logical path generation is performed based on the MAC address previously allocated to an ONU. Accordingly, when a plurality of MAC addresses are not allocated to the ONU, a plurality of logical paths cannot be generated. Moreover, the number of logical paths that can be generated is limited to the number of MAC addresses previously set to the ONU. Accordingly, a system can be considered in which an ONU acquires unique identity information from a connected terminal device, and the LLID generates logical path to the OLT based on the acquired ID information.

CITATION LIST

Patent Literature

Patent Literature 1: Japanese Patent Laid-Open No. 2007-74256

Non-Patent Literature

Non-Patent Literature 1: "gijutsu kiso kouza [GE-PON Gijutsu] dai 4 kai, GE-PON no shisutemuka kinou" ("Technical Basic Course [GE-PON technology] 4th, GE-PON Systematized Functions") NTT Technical Review, pp. 59-61, November 2005
Non-Patent Literature 2: IEEE802.3-2018, clause 64
Non-Patent Literature 3: IEEE1904.1 SIEPON

SUMMARY OF THE INVENTION

Technical Problem

As a typical method for obtaining information about a terminal device, it can be considered to acquire information included in an address resolution protocol (ARP) request from the terminal device and using a MAC address or the like of the terminal device as an information ID. However, in this case, the method is applied only to the terminal device that is directly connected to an ONU, and cannot be applied to environments where terminal devices of a plurality of users are connected to the ONU via a router device (NAPT device) such as Home Gateway. For this reason, a system is required which enables the ONU to acquire ID information of the terminal devices that are connected through a network device such as a router.

Accordingly, an object of the present disclosure is to enable an ONU to acquire ID information of terminal devices even when a network device is connected between the ONU and the terminal devices, and to thereby enable generation of a logical path between the ONU and the OLT.

Means for Solving the Problem

An optical communication network system of the present disclosure is a passive optical network (PON) system configured to connect a plurality of terminal devices to an optical network unit (ONU) via a network device. In the system, the network device and the ONU are provided with an L2 tunnel function to make the ONU function as a same local network under a router, and the ONU is provided with a function (ID acquisition unit) to acquire terminal IDs of the terminal devices and thereby acquires the ID information directly from the terminal devices. As a result, the system is configured to generate logical path generation addresses from the acquired ID information, and perform generation and management of the logical path for each of the terminal devices.

Here, the network device of the present disclosure is an optional device that can connect one or more terminal devices to an ONU, the optional device including Home Gateway and other router devices (Network address port translation (NAPT)/IP masquerade/Port Address Translation devices).

The optical communication network system according to the present disclosure is an optical communication network system configured to connect terminal devices and a passive optical network (PON) system via a network device. The PON system includes an optical line terminal and an optical network unit connected using an optical transmission line. The optical network unit is configured to construct a tunnel to the network device, acquire ID information of the terminal devices connected to the network device from the terminal devices via the tunnel, and generate a logical path to the optical line terminal on the optical transmission line using the acquired ID information.

An optical network unit according to the present disclosure is an optical network unit connected to an optical line terminal using an optical transmission line and connected to terminal devices via a network device. The optical network unit is configured to construct a tunnel to the network device, acquire ID information of the terminal devices connected to the network device from the terminal devices via the tunnel, and generate a logical path to the optical line terminal on the optical transmission line using the acquired ID information.

An optical communication method according to the present disclosure is an optical communication method executed by an optical network unit connected to an optical line terminal using an optical transmission line and connected to terminal devices via a network device. The optical communication method includes: constructing a tunnel to the network device; acquiring ID information of the terminal devices connected to the network device via the tunnel; and generating a logical path to the optical line terminal on the optical transmission line using the acquired ID information.

Effects of the Invention

According to the present disclosure, even when communication between an ONU and a terminal device is via a network device in the situation where a logical path between the ONU and an OLT is not generated, the ID information of the terminal device can be acquired and used to generate the logical path between the OLT and the ONU. As a result, logical path allocation can be performed for each terminal device, and different bandwidth allocation and priority control can be performed for each terminal device even when each terminal device is under the same ONU.

DESCRIPTION OF EMBODIMENTS

An embodiment of the present disclosure will be described hereinafter in detail with reference to the drawings. The present disclosure is not limited to the embodiment stated below. The embodiment is merely exemplary, and the present disclosure can be carried out in modes changed and modified in various manners based on the knowledge of those skilled in the art. Note that component members similar to each other are designated by similar signs in the present description and drawings.

(Outline of Present Disclosure)

Figure 1:
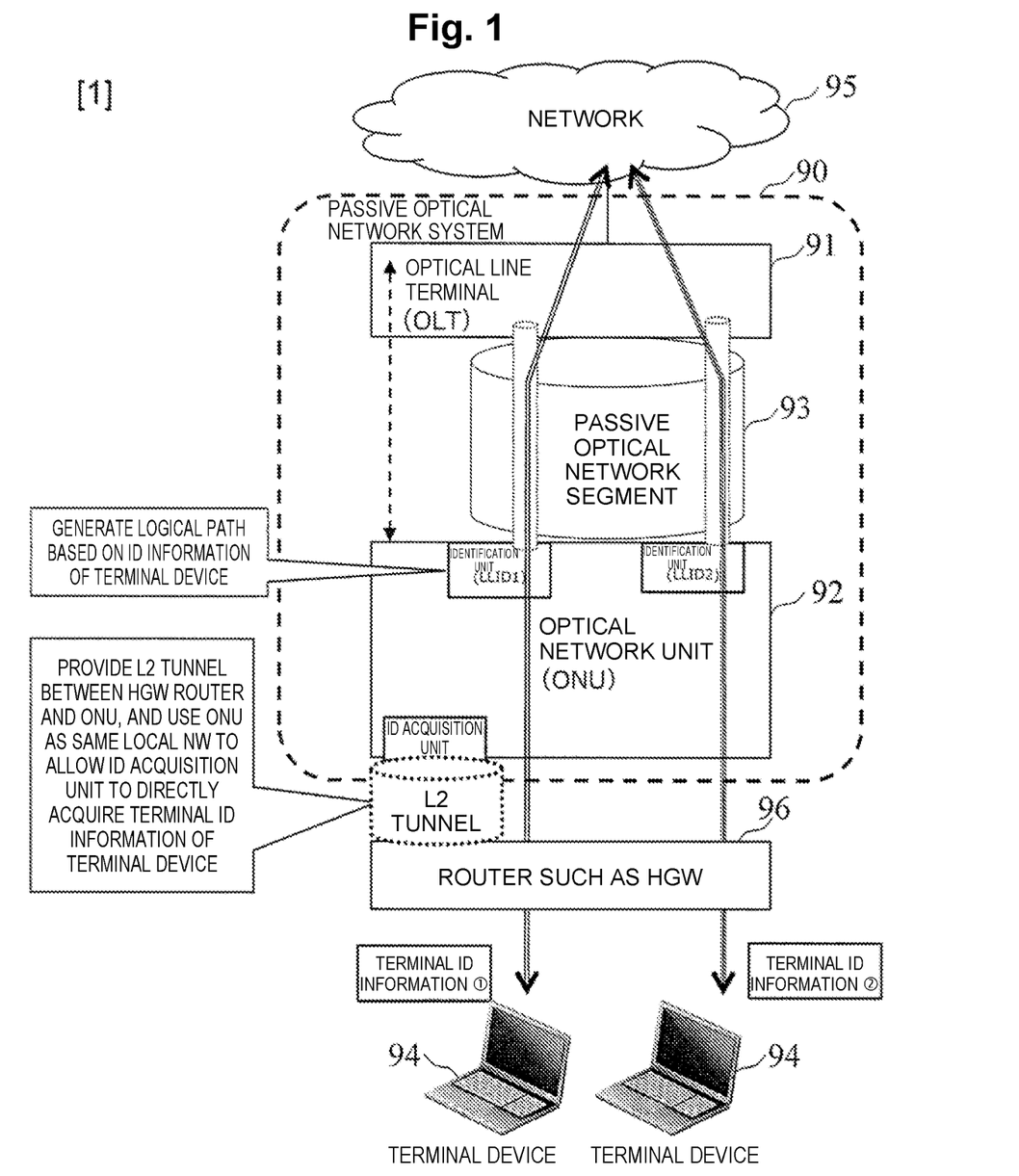
FIG. 1 shows an example of the schematic configuration of a system according to the present disclosure.

Hereinafter, the outline of the present disclosure will be described with reference to FIG. 1. In the present disclosure, a router 96, such as Home Gateway, and an ONU 92 are provided with an L2 tunnel function based on an open system interconnection (OSI) reference model, so that the ONU 92 is used as the same local network under the router 96. The ONU 92 is further provided with a function (ID acquisition unit) to acquire ID information of terminal devices 94 and thereby acquires the ID information directly from the terminal devices 94. Accordingly, the optical communication network system according to the present disclosure can generate addresses used to generate logical paths from the ID information obtained from the terminal devices 94, and generate and manage the logical paths for the respective terminal devices 94. The route 96 is an example of the network device of the present disclosure. In the embodiment described below, the network device is the router 96.

[Overall Configuration]

Figure 2:
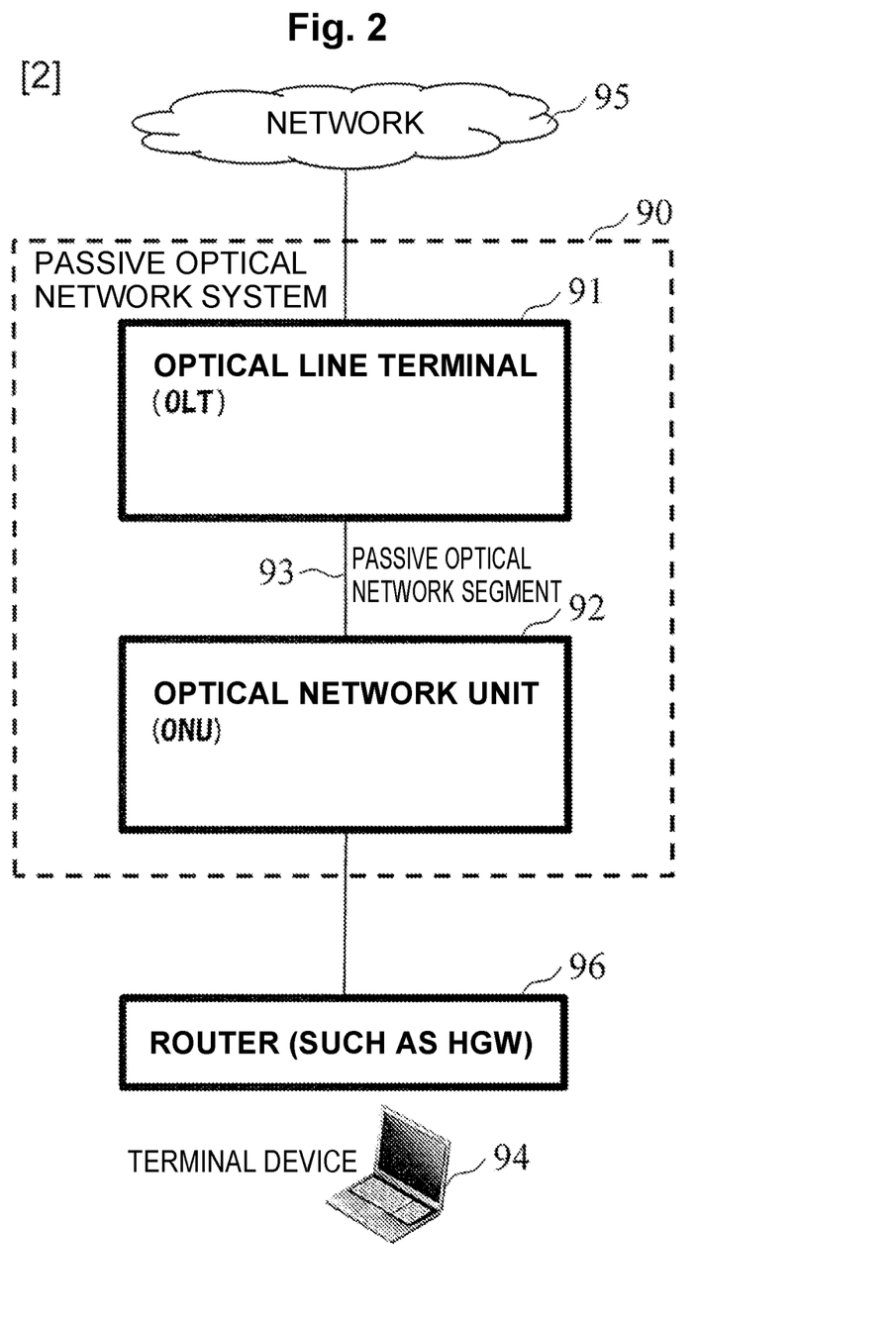
FIG. 2 shows an example of the overall configuration of the system of the present disclosure.

FIG. 2 shows an example of the system configuration of the present disclosure. The optical communication network system of the present disclosure includes the terminal devices 94 for users, the router 96, a PON system 90, and a network 95. The PON system 90 includes the ONU 92, an optical transmission line 93 in a PON segment, and an OLT 91.

The terminal devices 94 are connected to the router 96 via a wired or wireless medium. The router 96 is connected to the ONU 92 via a wired or wireless medium. The ONU 94 is connected for communication to the OLT 91 via the optical transmission line 93 in the PON segment. The router 96 is a device that connects the terminal devices 94 to the ONU 92, the router 96 including network address port translation (NAPT)/IP masquerade/Port address translation devices, and Home Gateway.

Typically, it is considered to acquire information included in an ARP request from the terminal device 94 and use the MAC address or the like of the terminal device 94 as the identification information. However, in this case, the method can be applied only to the terminal device 94 directly connected, and is not applicable to the environment where two or more terminal devices 94 are connected via the router 96. For this reason, a system is required which enables the ONU 92 to acquire ID information of the terminal devices 94 that are connected through the router 96. The ONU 92 usually inspect only the packets addressed to itself.

(Function Block Diagram)

Figure 3:
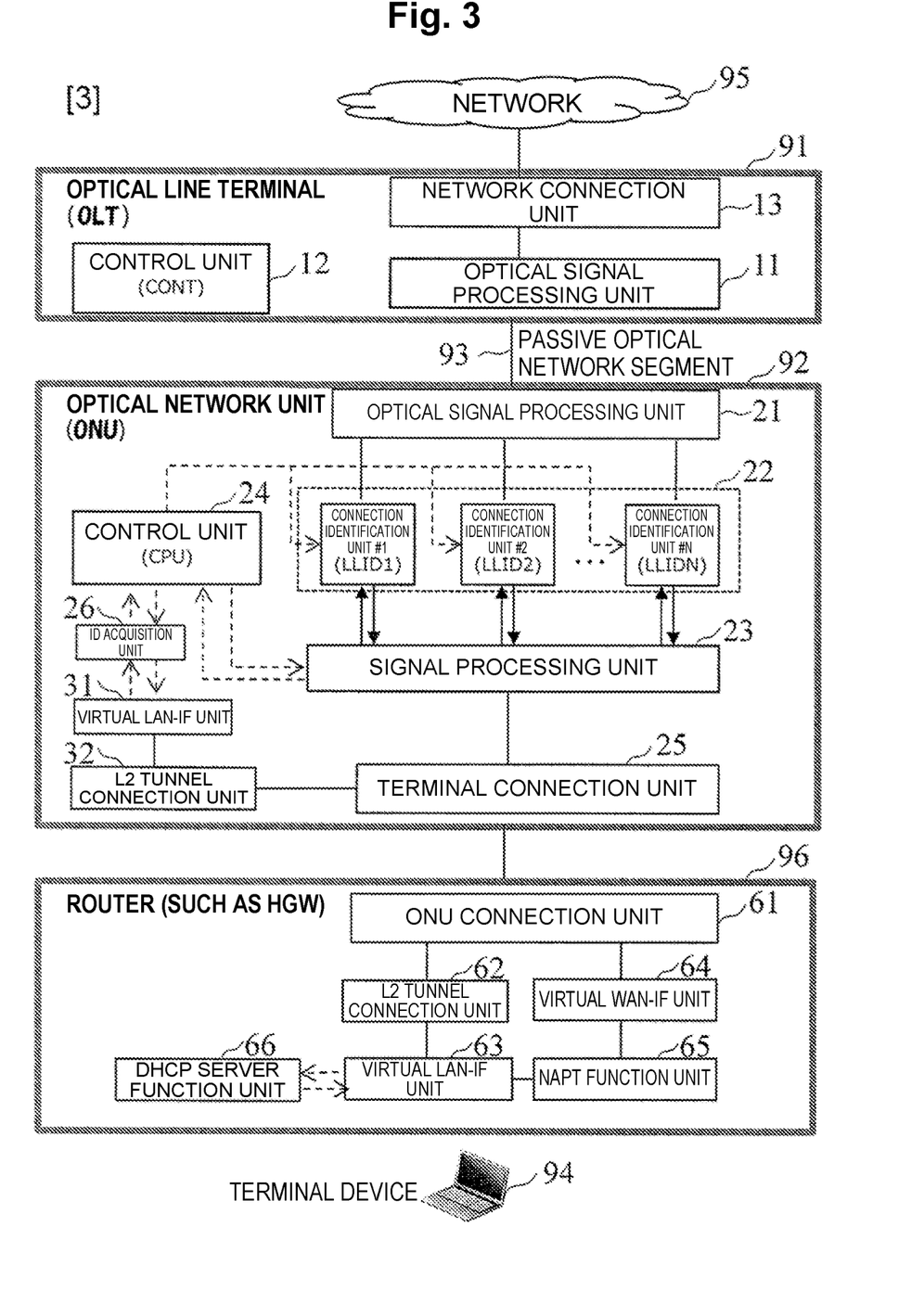
FIG. 3 shows an example of a functional block diagram of the system of the present disclosure.

FIG. 3 shows an example of a functional block diagram of the optical communication network system of the present disclosure.

The OLT 91 includes an optical signal processing unit 11, a control unit 12 and a network connection unit 13.

The ONU 92 includes a terminal connection unit 25, a signal processing unit 23, a control unit 24, connection identification units 22 (#1, #2, . . . , #N (where N is an integer greater than or equal to 2), an optical signal processing unit 21, an ID acquisition unit 26, a virtual LAN interface 31, and an L2 tunnel connection unit 32. In the drawings, the interface may be expressed as IF (interface).

The router 96 includes an ONU connection unit 61, a virtual WAN interface unit 64, a NAPT function unit 65, a virtual LAN interface unit 63, an L2 tunnel connection unit 62, and a dynamic host configuration protocol (DHCP) server function unit 66.

[Configuration of ONU]

The terminal connection unit 25 is connected for communication to the router 96 via a wired or wireless medium. The terminal connection unit 25 is also connected to the signal processing unit 23.

The signal processing unit 23 is connected to the terminal connection unit 25. The signal processing unit 23 is also connected to the optical signal processing unit 21 via N connection identification units 22 (#1 to #N) in pair with one of the N connection identification units 22. The signal processing unit 12 is also connected for communication to the control unit 24.

The control unit 24 is connected for communication to the signal processing unit 23. The control unit 24 is also connected for communication to the N connection identification units 22 (#1 to #N), respectively.

The control unit 24 includes, for example, a processor such as a central processing unit (CPU).

The optical signal processing unit 21 is connected for communication to the signal processing unit 23 via N connection identification units 22 (#1 to #N) in pair with one of the N connection identification units 22. The optical signal processing unit 21 is connected for communication to the OLT 91 via the optical transmission line 93 in the PON segment. Note that the connection identification units 22 are configured to identify, for example, the terminal devices 94 and the like based on the LLID, but are not limited to this configuration. For example, the connection identification units 22 can be configured by combining a connection identification unit that identifies the terminal device based on information different from the LLID, and a connection identification unit that identifies the terminal devices based on the LLID.

The L2 tunnel connection unit 32 uses an L2 tunneling protocol such as a layer 2 tunneling protocol (L2TP) to construct an L2 tunnel to the router 96 connected to the terminal connection unit 25.

The ID acquisition unit 26 is connected for communication to the virtual LAN interface unit 31 and the control unit 24, and notifies the control unit 24 of the ID information acquired from the virtual LAN interface unit 31.

[Configuration of OLT 91]

The optical signal processing unit 11 is connected for communication to the ONU 92 via the optical transmission line 93 in the PON segment. The signal processing unit 11 is also connected for communication to the network connection unit 13.

The control unit 12 includes a processor such as a CPU, for example.

The network connection unit 13 is connected for communication to the optical signal processing unit 11.

[Configuration of Router 96]

The ONU connection unit 61 is connected for communication to the ONU 92 via a wired or wireless medium. The ONU connection unit 61 is also connected for communication to the virtual WAN interface unit 64. The ONU connection unit 61 is further connected for communication to the virtual LAN interface unit 63 via the L2 tunnel connection unit.

The virtual LAN interface unit 63 is connected for communication to the terminal devices 94. The NAPT function unit 65 is connected for communication to the virtual WAN interface unit 64 and the virtual LAN interface unit 63, and performs NAPT processing between the two interfaces.

The DHCP server function unit 66 is connected for communication to the virtual LAN interface unit 63 and distributes an IP address to the opposite device (interfaces) that is connected for communication to the L2 tunnel function unit 62. For example, the DHCP server function unit 66 issues the IP address to the virtual LAN interface unit 31 of the ONU 92.

(Basic Flow at Time of Connecting Router 96)

Figure 4:
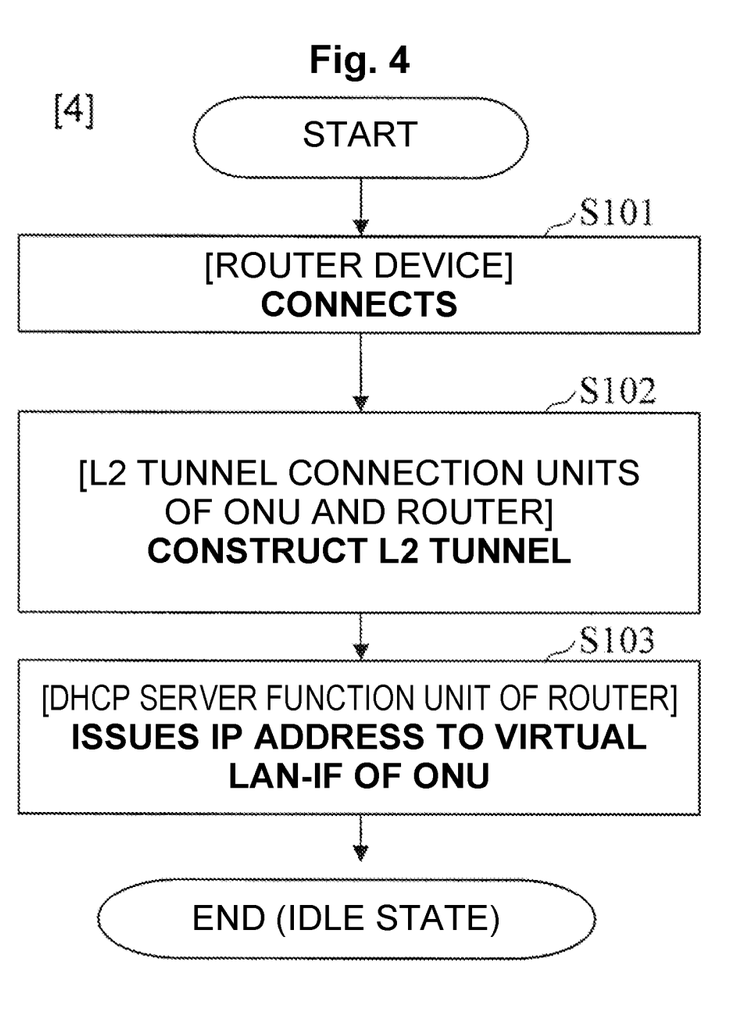
FIG. 4 shows a basic flow at the time of connecting a router and an ONU.

FIG. 4 shows the basic flow when the router 96 connects to the ONU 92.

Step S101: the router 96 connects to the ONU 92.

Step S102: Between the L2 tunnel connection unit 62 provided in the router 96 and the L2 tunnel connection unit 32 in the ONU 92, the router 96 and the ONU 92 constructs an L2 tunnel using the L2 tunneling protocol such as L2TP. In this case, for encryption, tunneling protocols having encryption functions, such as Ipsec and PPP, may be combined.

Step S103: the L2 tunnel connects the virtual LAN interface unit 31 of the ONU 92 and the virtual LAN interface unit 63 of the router 96 through an L2 layer.

The DHCP server function unit 66 of the router 96 issues an IP address to the virtual LAN interface unit 31 of the ONU 92, and recognizes the ONU 92 as a device in the local network of the router 96.

In this case, the DHCP server function unit 66 may use one of IPv4 and IPv6. The DHCP server function unit 66 may also be included in devices disposed at locations other than the location of the router 96 (for example, in the local network of the router 96 or in a high-order network of the ONU 92). However, in that case, the DHCP server function unit 66 needs to be reachable to the virtual LAN interface unit 31 of the ONU 92 and the virtual LAN interface unit 63 of the router 96 and be able to allocate the IP address.

(Basic Flow at Time of Connecting Terminal Device 94 for Communication)

Figure 5:
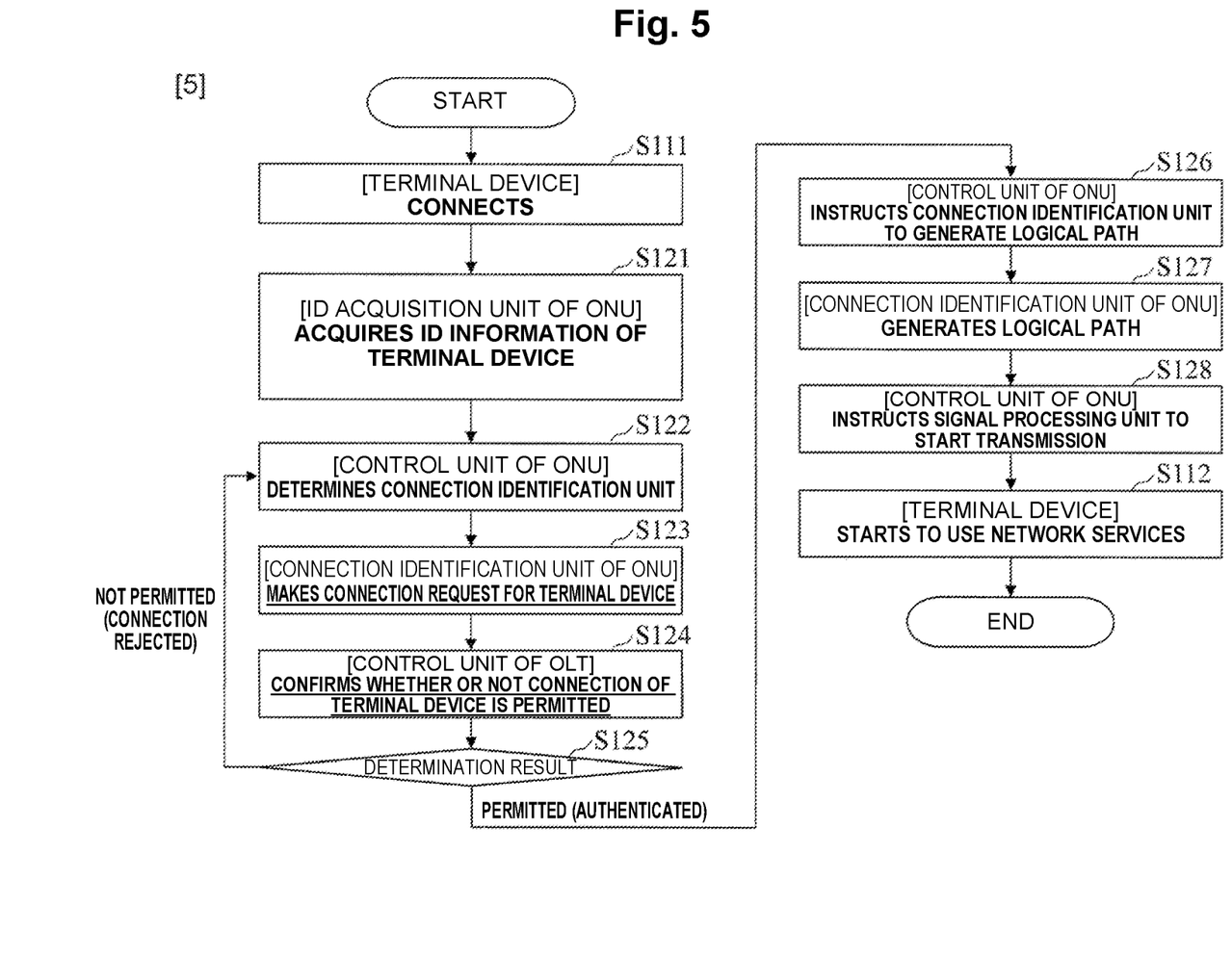
FIG. 5 shows an example of a basic flow at the time of connecting a terminal device and the router.
Figure 6:
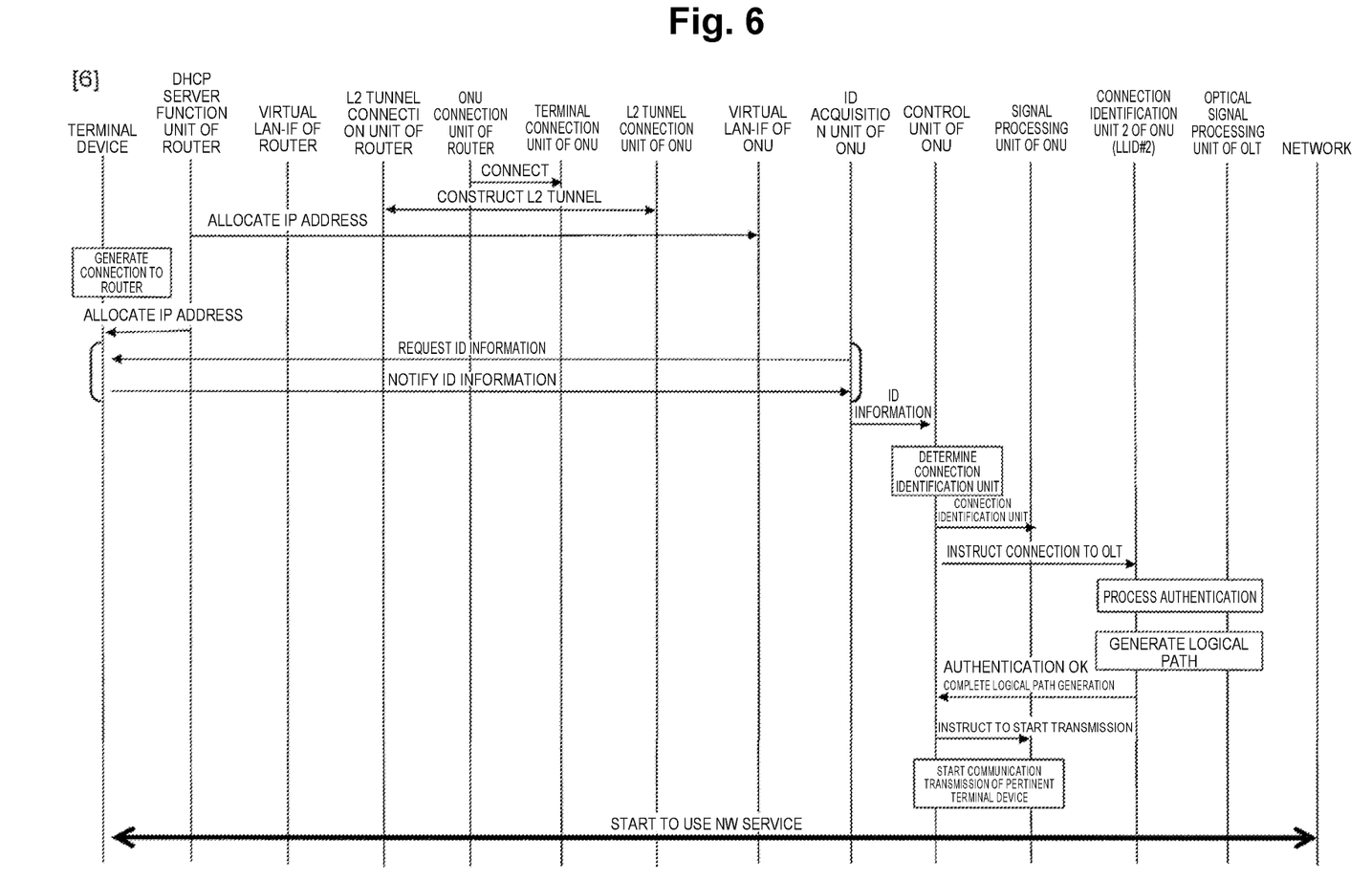
FIG. 6 shows a sequence diagram at the time of connecting the terminal device and the router.

FIG. 5 shows the basic flow at the time of connecting the terminal device 94. FIG. 6 shows a sequence diagram at the time of connecting the terminal device 94. With reference to FIGS. 5 and 6, operation at the time of connecting the terminal device 94 in the present embodiment will be described. The L2 tunnel between the router 96 and the ONU 92 is assumed to be constructed before the terminal device 94 is connected.

Step S111: the terminal device 94 is connected to the router 96.

Step S121: the ID acquisition unit 26 included in the ONU 92 acquires information about the terminal device 94 by an APR request or the like via the L2 tunnel, and notifies the control unit 24 of the ID information of the terminal device 94.

Step S122: the control unit 24 determines the connection identification unit 22 #2 used to connect to the OLT 91. The control unit 24 then acquires the ID information from the ID acquisition unit 26 and uses the ID information of the terminal device 94 to generate a virtual MAC address of the connection identification unit 22 #2.

The control unit 24 gives a connection instruction using the virtual MAC address to the determined connection identification unit 22 #2. The control unit 24 also notifies the signal processing unit 23 of the LLID and ID information of the connection identification unit 22 #2.

Step S123: the connection identification unit 22 #2 makes a connection request for terminal device 94 to the OLT. In this case, the connection identification unit 22 #2 makes an authentication request to the OLT 91.

Step S124: the control unit 12 of the OLT 91 authenticates the terminal device 94 using the LLID and the virtual MAC address received from the connection identification unit 22 #2 to confirm whether or not connection is permitted. When acquiring the authentication result from the OLT 91, the connection identification unit 22 #2 notifies the control unit 24 of the authentication result.

Step S125: when the result of authentication by the OLT 91 is OK, i.e., "permitted (authenticated)", the control unit 24 shifts to step S126. Meanwhile, when the result of authentication is NG, the control unit 24 determines the connection identification unit 22 #1 which is different from the connection identification unit 22 #2.

Here, in step S122, the number of ID information pieces acquired by the ID acquisition unit 26 may be any number greater than or equal to 1. The number of and a combination of ID information pieces used by the control unit 24 to generate the virtual MAC address is optional.

The ID information may be an identifier that uniquely determines the terminal device 94. Examples of the ID information may include following identifiers, any of which can be used.

Figure 7:
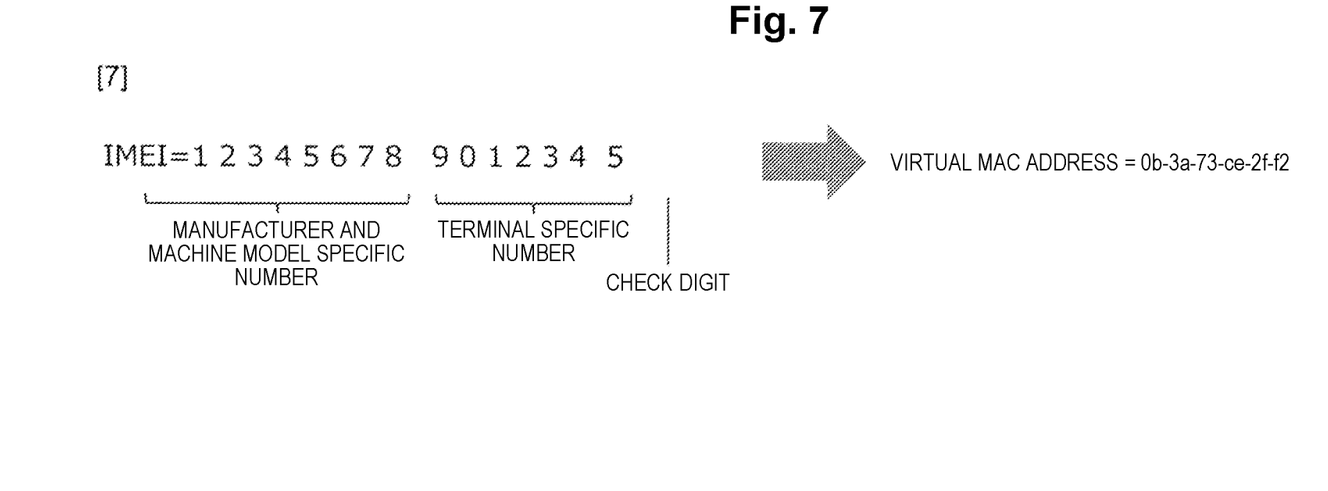
FIG. 7 shows an example of a method of generating a virtual MAC address.

MAC address
Subscriber identity module (SIM)
International mobile equipment identifier (IMEI)
Phone number
International mobile subscriber identity (IMSI)
IC card identifier (ICCID)
Host name
Production serial number The virtual MAC address can be generated in any way. For example, there is a method of generating a new virtual MAC address from only the ID information of the terminal device 94, without linking the physical MAC address of the ONU 92 with the ID information of the terminal device 94. For example, as shown in FIG. 7, out of an IMEI (decimal number of up to 15 digits) of the terminal device 94, a number of up to 14 digits excluding a last check digit is converted to a hexadecimal number. When the digits of the number is less than 12 digits, 0 is appended to upper digits to generate the virtual MAC address, and the generated virtual MAC address is used to identify and authenticate the terminal device 94.

The ID information may have priority set for generation of the virtual MAC address. Examples of the operation of the ID acquisition unit 26 and the control unit 24 may include the followings.

The ID acquisition unit 26 acquires a plurality of ID information pieces at once, and the control unit 24 generates the virtual MAC address by using the ID information pieces in a specific priority. When authentication is not obtained in a connection request, the control unit 24 generates the virtual MAC address in sequence by using the ID information pieces specified according to the priority.

The ID acquisition unit 26 acquires a plurality of ID information pieces at once, the control unit 24 combines the plurality of ID information pieces to generate the virtual MAC address, and the control unit 24 uses the virtual MAC address to perform authentication. The authentication is performed by matching the respective ID information pieces included in the virtual MAC address. In this case, the control unit 24 may change a high-order connection destination of the OLT 91 based on the matching state of the plurality of ID information pieces.

Note that when connection is rejected in authentication determination performed in step S125, the control unit 24 may return to acquire the ID information (S121). In this case, examples of the processing by the ONU 92 may be as shown below.

The ID acquisition unit 26 acquires information from various types of ID information according to a specific priority. The flow of steps S121 to S125 is sequentially repeated until authentication "permitted" is achieved.

The ID acquisition unit 26 performs a plurality of acquisition methods to acquire the same ID information according to a specific priority. The flow of steps S121 to S125 is sequentially repeated while the acquisition methods performed by the ID acquisition unit are changed until authentication "permitted" is achieved.

Step S127: the connection identification unit 22 #2 generates a logical path between the ONU 92 and the OLT 91. Once the logical path is generated, the connection identification unit 22 #2 notifies the control unit 24 that generation of the logical path is completed. In this case, the connection identification unit 22 #2 may also notify the control unit 24 that the authentication result is OK.

Step S128: the control unit 24 instructs the signal processing unit 23 to start transmission between the connection identification unit #2 and the terminal device 94. Step S112: the terminal device 94 starts to use network services.

The connection processing for the terminal device 94 is completed by the OLT 91 and the ONU 92 performing the above processing. Note that the authentication processing in step S125 can be performed after the logical path is generated or at the same time when the logical path is generated.

FIG. 7 shows examples of a logical path for each terminal device 94 (or each user). The logical path for each terminal device 94 is generated one application for each terminal device 94 as shown in FIG. 7(*a*), for example. When one terminal device 94 runs a plurality of applications, the ONU 92 may generate a single logical path for the plurality of applications as shown in FIG. 7(*b*). When the plurality of terminal devices 94 run a common application, the ONU 92 may generate a logical path for each of the terminal device 94 as shown in FIG. 7(*c*). Here, the logical path may be generated for each terminal device group or for each type of the terminal devices 94 instead of for each terminal device 94. As shown in FIG. 7(*d*), the ONU 92 may also generate a logical path different for each connection method (WiFi, wired, etc.) used between the terminal device 94 and the router 96. The method of logical path generation is also applicable to the cases without using a device, such as the router 96, to connect the terminal device 94 to the ONU 92.

Figure 8:
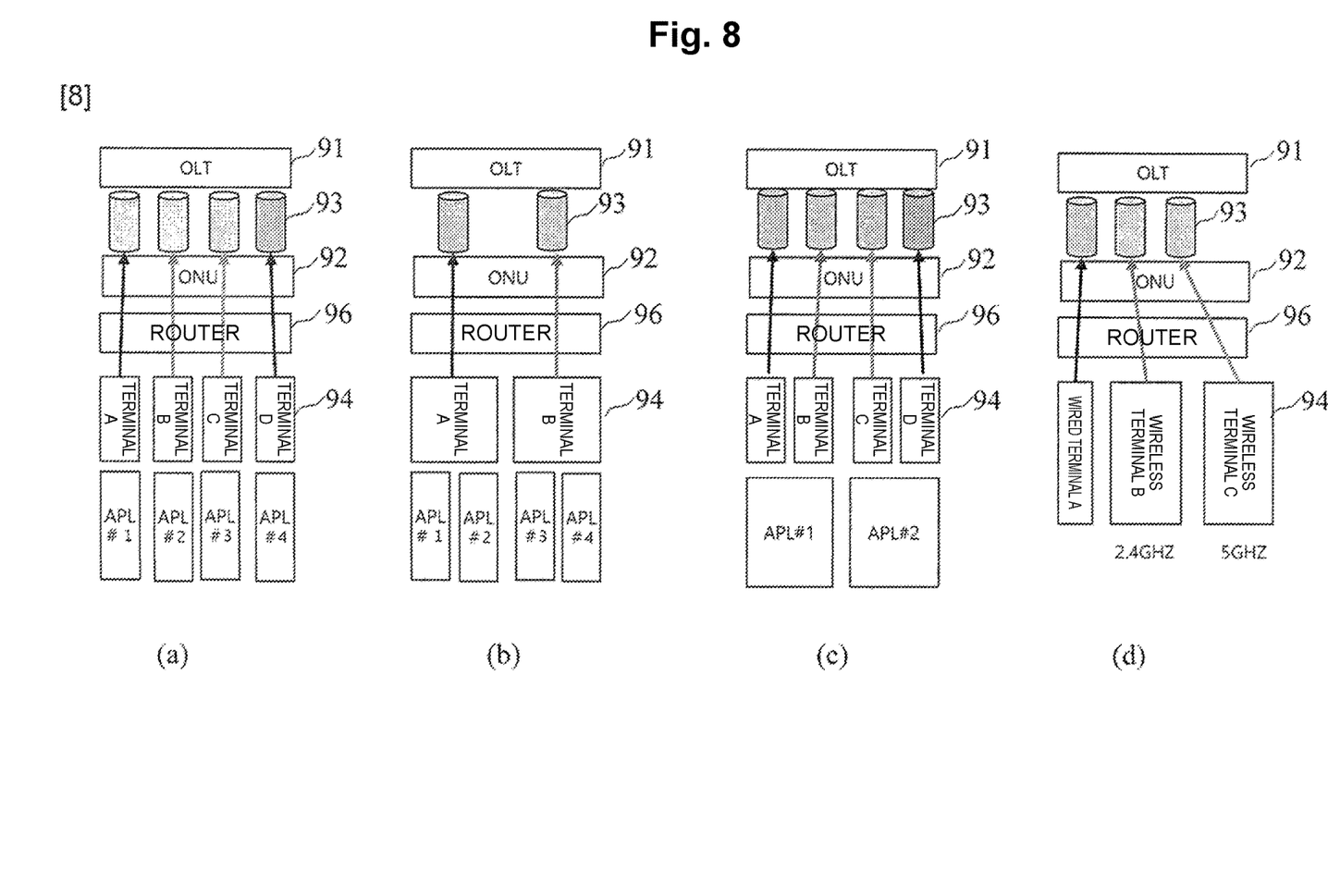
FIG. 8 shows examples of a logical path for each terminal device.
Figure 9:
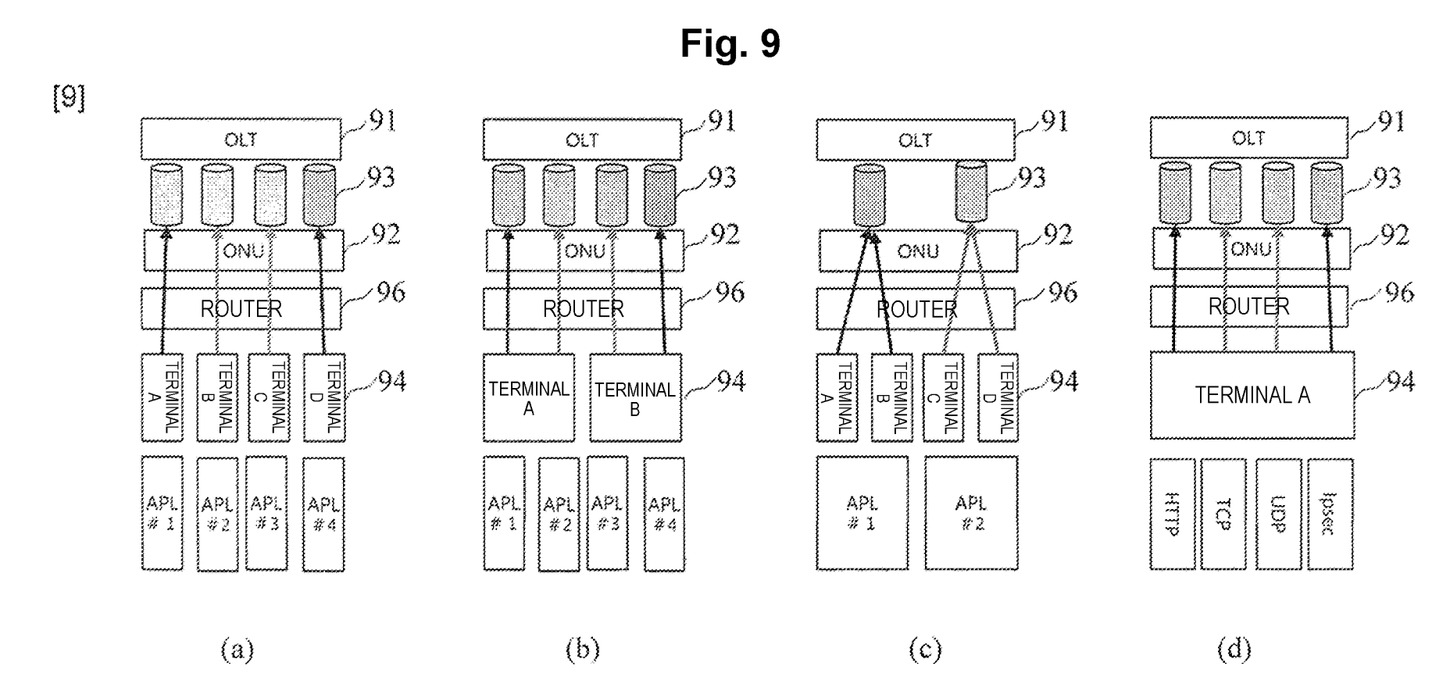
FIG. 9 shows examples of a logical path for each service.

FIG. 8 shows examples of a logical path for each service. The logical path is generated one application for each terminal device 94 as shown in FIG. 8(*a*) for example. When one terminal device 94 runs a plurality of applications, the ONU 92 may generate a plurality of logical paths for the one terminal device 94 according to the number of applications as shown in FIG. 8(*b*). When the plurality of terminal devices 94 run a common application, the ONU 92 may generate a common logical path for the plurality of terminal device 94 as shown in FIG. 8(*c*). Here, the logical path may be generated for each application group or application type instead of for each application. As shown in FIG. 8(*d*), the ONU 92 may also generate a logical path different for each communication protocol for one terminal device 94. The method of logical path generation is also applicable to the cases without using a device, such as the router 96, to connect the terminal device 94 to the ONU 92.

INDUSTRIAL APPLICABILITY

This disclosure may be applied to the information and communications industry.

REFERENCE SIGNS LIST

11, 21 Optical signal processing unit
12, 24 Control unit
13 Network connection unit
22 Connection identification unit
23 Signal processing unit
25 Terminal connection unit 26 ID acquisition Unit
31, 63 Virtual LAN interface
32, 62 L2 tunnel connection unit
61 ONU connection unit
64 Virtual WAN interface
65 NAPT function unit
66 DHCP server function unit
90 PON system
91 OLT
92 ONU
93 Optical transmission line
94 Terminal device
95 Network
96 Router

The invention claimed is:

1. An optical communication network system configured to connect terminal devices and a passive optical network (PON) system via a network device, wherein
the PON system includes an optical line terminal and an optical network unit connected using an optical transmission line, and
the optical network unit is configured to
construct a tunnel to the network device, acquire ID information of the terminal devices connected to the network device from the terminal devices via the tunnel, and
generate a logical path to the optical line terminal on the optical transmission line using the acquired ID information.

2. The communication network system according to claim 1, wherein
the optical network unit constructs the tunnel to the network device using an L2 tunnel of an OSI reference model.

3. An optical network unit connected to an optical line terminal using an optical transmission line and connected to terminal devices via a network device, the optical network unit being configured to:
construct a tunnel to the network device,
acquire ID information of the terminal devices connected to the network device from the terminal devices via the tunnel, and
generate a logical path to the optical line terminal on the optical transmission line using the acquired ID information.

4. An optical communication method executed by an optical network unit connected to an optical line terminal using an optical transmission line and connected to terminal devices via a network device, the optical communication method comprising:
constructing a tunnel to the network device;
acquiring ID information of the terminal devices connected to the network device via the tunnel; and
generating a logical path to the optical line terminal on the optical transmission line using the acquired ID information.

* * * * *